US007948985B2

(12) United States Patent
Lu et al.

(10) Patent No.: US 7,948,985 B2
(45) Date of Patent: May 24, 2011

(54) METHODS, SYSTEMS, AND COMPUTER PROGRAM PRODUCTS FOR SOURCE-AWARE IP ROUTING AT A MEDIA GATEWAY

(75) Inventors: David Z. Lu, Dallas, TX (US); Edward Y. Qian, Plano, TX (US); Rupert Zhu, Richardson, TX (US); San-Qi Li, Plano, TX (US)

(73) Assignee: Genband US LLC, Plano, TX (US)

( * ) Notice: Subject to any disclaimer, the term of this patent is extended or adjusted under 35 U.S.C. 154(b) by 412 days.

(21) Appl. No.: 11/961,658

(22) Filed: Dec. 20, 2007
(Under 37 CFR 1.47)

(65) Prior Publication Data
US 2008/0279201 A1    Nov. 13, 2008

Related U.S. Application Data

(60) Provisional application No. 60/876,497, filed on Dec. 20, 2006.

(51) Int. Cl.
*H04L 12/28* (2006.01)
(52) U.S. Cl. ......................................... 370/392; 370/401
(58) Field of Classification Search ........................ None
See application file for complete search history.

(56) References Cited

U.S. PATENT DOCUMENTS

| 6,084,892 | A | 7/2000 | Benash et al. | |
| 6,430,188 | B1 * | 8/2002 | Kadambi et al. | 370/398 |
| 6,665,297 | B1 * | 12/2003 | Hariguchi et al. | 370/392 |
| 6,687,247 | B1 * | 2/2004 | Wilford et al. | 370/392 |
| 6,956,820 | B2 * | 10/2005 | Zhu et al. | 370/230.1 |
| 7,039,053 | B1 * | 5/2006 | Freed et al. | 370/392 |
| 7,120,090 | B2 * | 10/2006 | Smith | 368/10 |
| 7,325,071 | B2 * | 1/2008 | Krishnan | 709/238 |
| 2003/0108030 | A1 | 6/2003 | Gao | |
| 2004/0081154 | A1 | 4/2004 | Kouvelas | |
| 2005/0002388 | A1 | 1/2005 | Gao | |

OTHER PUBLICATIONS

"Understanding EtherChannel Load Balancing and Redundancy on Catalyst Switches," www.cisco.com, pp. 1-8 (Jul. 9, 2007).
"IP Interfaces and NAT," www.sustworks.com, pp. 1-8 (Publication Date Unknown).
Notification of Transmittal of the International Search Report and the Written Opinion of the International Searching Authority, or the Declaration for International Application No. PCT/US07/26036 (Jun. 23, 2008).

* cited by examiner

*Primary Examiner* — Robert W Wilson
(74) *Attorney, Agent, or Firm* — Jenkins, Wilson, Taylor & Hunt, P.A.

(57) ABSTRACT

The subject matter described herein includes methods, systems, and computer program products for source-aware IP routing at a media gateway. According to one aspect, a method for source-aware IP routing at a media gateway is provided. The method includes providing a packet including a layer 3 source address and a layer 3 destination address at a media gateway having a source-aware routing table. Using the destination address included in the packet, at least one entry corresponding to the destination address is located in the source-aware routing table, where the located entry contains at least a portion of a source IP address, at least a portion of a destination IP address and routing information including an interface identifier and a next hop identifier. From among the at least one located entry corresponding to the destination IP address information, at least one entry corresponding to the source IP address included in the packet is located. Based on the routing information located in the routing table, the packet is routed to the destination.

18 Claims, 3 Drawing Sheets

METHODS, SYSTEMS, AND COMPUTER PROGRAM PRODUCTS FOR SOURCE-AWARE IP ROUTING AT A MEDIA GATEWAY

RELATED APPLICATIONS

The presently disclosed subject matter claims the benefit of U.S. Provisional Patent Application Ser. No. 60/876,497, filed Dec. 20, 2006; the disclosure of which is incorporated herein by reference in its entirety.

TECHNICAL FIELD

The subject matter described herein relates to a media gateway. More particularly, the subject matter described herein relates to methods, systems, and computer program products for source-aware IP routing at a media gateway.

BACKGROUND

A media gateway (MG) is a network node straddling two network domains and mediating between two different networks while providing media level physical resources appropriate to a specific connected network. Typically, media gateways are situated between a public switched telephone network (PSTN) network and an Internet protocol (IP) network. When a connection requiring MG services is made, such as a voice over IP (VOIP) call, MGs may communicate with other MGs over an IP network. Often, MGs are connected together by multiple routes in an IP communications network. A conventional MG uses destination-based IP routing tables and destination-based routing algorithms to route IP packets to other MGs. For example, the routing table in a conventional MG includes an entry containing routing information associated with each destination. Thus, all packets addressed to a particular MG are routed via the route defined in the destination-based routing table entry corresponding to that destination.

Additionally, conventional media gateways typically route packets based on data flows, such as a transmission control protocol (TCP) or user datagram protocol (UDP) sessions. Packets belonging to the same data flow as those previously transmitted are transmitted to the destination via the same route as the previously transmitted packets in the data flow. Because the route used to transmit a packet may depend on the route used to route a previous packet, the destination node must initially transmit one or more packets before subsequent dataflow-based packet forwarding may be used.

One problem associated with data flow based packet forwarding used in conventional media gateways is that complex logic is required to process data flow packets. This additional complexity increases the cost and transmission delay for packets routed at a MG using conventional routing methods.

Another problem associated with destination-based IP routing used in conventional MGs is an inability to route packets over multiple routes to a single destination. Because destination-based IP routing tables associate a single destination with a single route, all packets addressed to a particular destination address are transmitted over only one of the available routes.

Yet another problem associated with destination-based IP routing in conventional MGs is an inability to load-balance IP traffic between MGs connected by multiple routes. For example, a conventional MG routing table contains one entry for each destination address, where each entry contains information associated with a route to the destination. For example, packets addressed to a first destination may be routed via a first outgoing interface and a first nexthop address. Therefore, if two MGs are connected by multiple outgoing interfaces and multiple nexthop addresses, the routing tables for each conventional MG specifies only one route, not multiple routes. As the number of IP packets transmitted between MGs increases, the importance of load-balancing IP traffic over multiple routes between MGs grows.

Accordingly, a need exists for improved methods and systems for load-balancing IP traffic between media gateways connected by multiple routes.

SUMMARY

The subject matter described herein includes methods, systems, and computer program products for source-aware IP routing at a media gateway. According to one aspect, a method for source-aware IP routing at a media gateway is provided. The method includes providing a packet including a layer 3 source address and a layer 3 destination address at a media gateway having a source-aware routing table. Using the destination address included in the packet, at least one entry corresponding to the destination address is located in the source-aware routing table, where the located entry includes or is indexed by at least a portion of a source IP address and at least a portion of a destination IP address and includes routing information including an interface identifier and a next hop identifier. From among the at least one located entry corresponding to the destination IP address in the packet, at least one entry corresponding to the source IP address included in the packet is located. Based on the routing information located in the routing table, the packet is routed to the destination.

The subject matter described herein for source-aware IP routing at a media gateway may be implemented using a computer program product comprising computer executable instructions embodied in a non-transitory computer readable medium. Exemplary computer readable media suitable for implementing the subject matter described herein include chip memory devices, disk memory devices, programmable logic devices, and application specific integrated circuits. In addition, a computer program product that implements the subject matter described herein may be implemented using a single device or computing platform or may be distributed across multiple devices or computing platforms.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Figure 1:
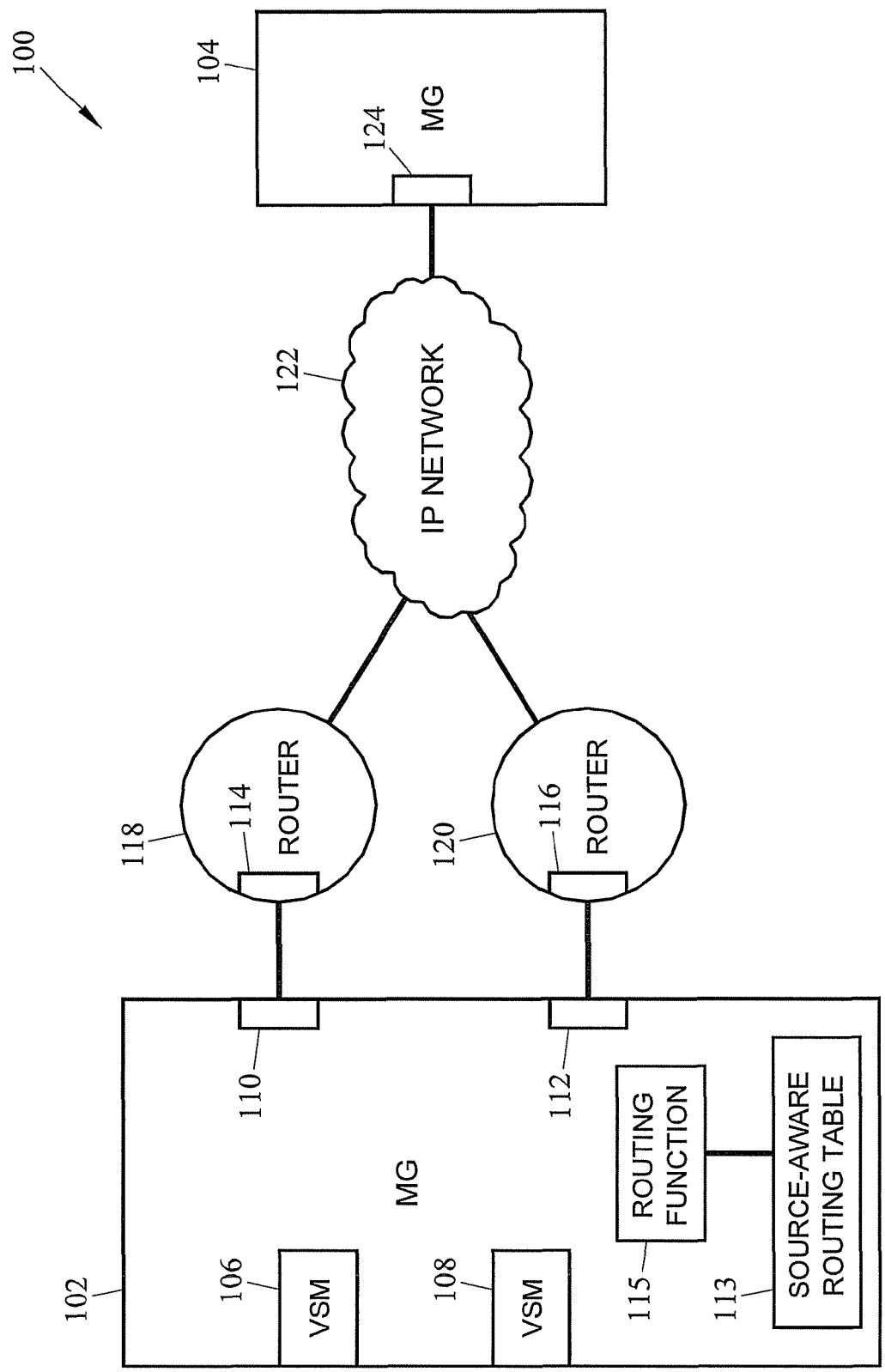
FIG. 1 is a network diagram of two media gateways capable of performing source-aware routing of IP packets that are connected by multiple routes according to an embodiment of the subject matter described herein.

FIG. 1 is a network diagram illustrating an exemplary network 100 including media gateways 102 and 104 capable of performing source-aware IP routing of IP packets over multiple routes. Referring to FIG. 1, network 100 is an Internet protocol (IP) network and media gateway (MG) 102 is connected to MG 104 by multiple routes.

In FIG. 1, MG 102 includes two voice server modules (VSMs) 106 and 108 configured to process packets received by MG 102. VSM 106 and 108 are each identified by a unique IP address. Upon processing a packet, VSM 106 and 108 may modify header information contained in the packet to include its IP address of the VSM 106 or 108 as the source IP address for the packet. For example, VSMs 106 and 108 may contain IP addresses 123.456.789.000 and 123.456.789.001, respectively. Packets processed by VSM 106 may include source address 123.456.789.000, and packets processed by VSM 108 may therefore include source address 123.456.789.001. By assigning source addresses based on the VSM processing the packet, greater routing precision may be achieved than if all packets processed by MG 102 included the same source address.

For packets transmitted by MG 102, a lookup is performed in source-aware routing table 113. A routing function 115 may perform the lookups described herein in source aware routing table 113. In FIG. 1, MG 102 includes source-aware routing table 113 containing entries associating source and destination IP addresses with routing information used for routing packets from the source address to the destination address. Routing information contained in source-aware routing table 113 may include, for example, an outgoing interface, a nexthop address, and/or route cost information. The details of source-aware routing table 113 will be described in greater detail below.

Upon locating a matching entry in source-aware routing table 113, a packet may be internally routed to one of outgoing interfaces 110 or 112. For example, a packet processed by VSM 106 may be routed to interface 110 or 112 based on information contained in source-aware routing table 113 located at MG 102.

Upon being routed to one of outgoing interfaces 110 or 112, a packet may be routed to nexthop address 114 or 116. In the example illustrated in FIG. 1, nexthop addresses 114 and 116 correspond to interfaces located at routers 118 and 120, respectively. It is appreciated that routers 118 and 120 may include multiple interfaces. Moreover, while FIG. 1 illustrates a single link connecting interface 110 to interface 114, it is appreciated that interface 110 may also connect to interface 116 or any other number of interfaces. Similarly, interface 112 may also be cross-connected to multiple additional interfaces, such as interface 114 on router 118.

Continuing the example described above, a packet received at either router 118 or 120 is then routed to MG 104 through IP network 122. More specifically, packets are routed to interface 124 located at MG 104. Because MG 104 may include multiple interfaces, packets intended for MG 104 include a destination address corresponding to a particular interface at MG 104, such as interface 124. Packets received by MG 104 therefore include a source address corresponding to VSM 106 or 108 and a destination address corresponding to interface 124.

Typically, packets transmitted between MGs 102 and 104 constitute a two-way data flow, such as a voice over Internet protocol (VoIP) call. In these situations, it is important to maintain similar transmission delays for each direction of the data flow so that the VoIP call is "in sync". For example, packets associated with a VoIP call between a first client device connected to MG 102 (not shown) and a second client device connected to MG 104 (not shown), may be routed using routing tables located on MGs 102 and 104. These routing tables, such as routing table 113, may be configured so that packets belonging to the same session transmitted in one direction do not suffer significantly higher delays than packets transmitted in the opposite direction. This may be achieved by populating each routing table with identical entries with reversed source and destination addresses. Further, it is appreciated that routing tables coordinated in the manner described above may be located at network routing nodes in addition to the source and destination nodes.

Figure 2:
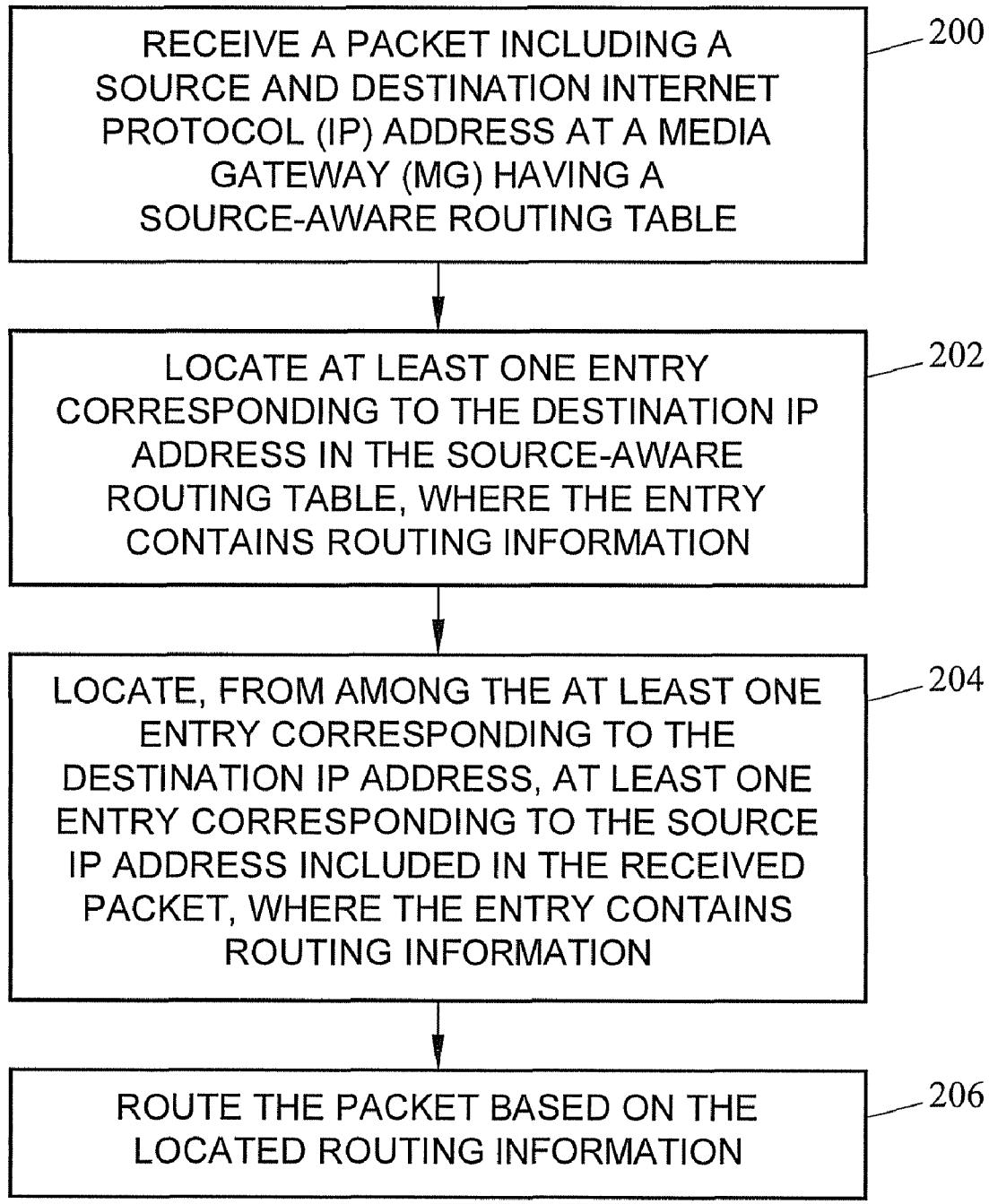
FIG. 2 is a flow chart of exemplary steps for performing source-aware routing of IP packets between media gateways connected by multiple routes according to an embodiment of the subject matter described herein.

FIG. 2 is a flow chart illustrating an exemplary process for performing source-aware IP routing between media gateways connected by multiple routes. Referring to FIG. 2, in block 200, a packet including a source address and a destination address is received at MG 102 having source-aware routing table 113. As described above, the source address of a packet may be assigned by the voice server module (VSM) processing the packet. For example, a packet processed by VSM 106 may be identified by source address IPh1 and a packet processed by VSM 108 may be identified by source address IPh2. Additionally, a client device may be connected to MG 102 and initiate a VoIP session to a terminating client device connected to MG 104. Continuing this example, a packet received by MG 102 from the client device is processed by VSM 106. Thus, the received packet includes source address IPh1 corresponding to VSM 106 and destination address IPr corresponding to interface 124 on MG 104.

In block 202, at least one entry corresponding to the destination address is located, where the entry contains routing information. The at least one entry may be located by performing a lookup in a routing table located on media gateway 102. Table 1 shown below illustrates an exemplary source-aware routing table that may be located on media gateway 102.

TABLE 1

Exemplary Source-Aware Routing Table

| Destination Address | Source Address | Route Cost | Outgoing Interface | Nexthop Address |
|---|---|---|---|---|
| IPr | IPh1 | 1 | IPi1 | IPn1 |
| IPr | IPh1 | 2 | IPi2 | IPn2 |
| IPr | IPh2 | 1 | IPi2 | IPn2 |
| IPr | IPh2 | 2 | IPi1 | IPn1 |

In the table illustrated above, the first and second columns include destination and source address information respectively. Referring to Table 1, each of the four illustrated entries contains destination address information associated with IPr. Referring to FIG. 1, destination address IPr corresponds to interface 124 located at media gateway 104 and source addresses IPh1 and IPh2 correspond to voice server modules 106 and 108, respectively. The third column contains cost information associated with each route connecting the source and destination addresses. The route cost information included in Table 1 is optionally included for illustrative purposes only. Information other than route cost information may be included in routing table 113, such as preference values, and associated with each route entry.

Returning to block 202, at least one entry corresponding to destination address IPr is located in source-aware routing table 113. For example, in the source-aware routing table 1 above, all four entries include destination address IPr corresponding to destination interface 124.

Next, in block 204, at least one entry corresponding to source address IPh1 included in the packet is located from among the at least one entry corresponding to the destination address located in block 202. Referring again to Table 1, from among the four entries containing destination address IPr, the first two entries contain source address IPh1. The at least one entry located in block 204 may be located using a longest prefix matching (LPM) algorithm or other suitable method whereby one or more matching entries are located from among a set of at least one entry.

In block 206, the packet is routed using routing information contained in the entry located in block 204. For some packets, a single matching entry may be located in block 204 based on the lookup performed in blocks 202 and 204. For other packets, two or more entries may be located in block 204 based on source and destination address information contained in the packet. For such packets, additional information may be included in source-aware routing table 113 and used to differentiate multiple routes between the same source and destination address.

Continuing the example above, with reference to exemplary source-aware routing table 1, two entries located in block 204 corresponding to source address IPh1 and destination address IPr must be differentiated in order to route the packet. Therefore, in order to determine the single route to be used to route the packet to the destination, a user-configurable value associated with each entry may be used to differentiate routes sharing a common source and destination.

In one embodiment, source-aware routing table 113 includes a user-configurable route cost value associated with each entry. In the event that two or more entries exist in the routing table containing the same destination and source address, the route cost may be used to determine the entry to be used to route the packet. For example, the packet may be routed based on the routing information associated with the least expensive route.

It is appreciated that within a plurality of entries containing identical source and destination addresses, unique route cost values are assigned. This is so that when route cost values are used to differentiate routes, no two entries in source-aware routing table 113 include identical source addresses, destination addresses, and route costs. In the example illustrated in Table 1, a lower route cost value indicates a preferred route. Therefore, the packet processed by voice server module 106 and intended for destination interface 124 may be routed by either outgoing interface 110 and 114 or by interfaces 112 and 116, depending on the route cost. Referring to Table 1, the packet including source IPh1 and destination IPr is routed via outgoing interface IPi1 (corresponding to interface 110) and nexthop IPn1 (corresponding to interface 114) because the entry for this route contains the lowest route cost value. In Table 1, the route cost for route 110/114 is 1 and the route cost associated with route 112/116 is 2. In the event that the operator of MG 102 wished to reduce the load on route 110/114, the route cost for route 110/114 may be increased, such as to a value of 3, so as to make route 112/116 the preferred route for packets between IPh1 and IPr.

In another embodiment, the user-configurable value, such as the route cost described above, may be automatically assigned. For example, media gateway 102 may be configured to monitor IP traffic for various network conditions and automatically adjust one or more user-configurable values associated with one or more entries in the routing table.

In one embodiment, media gateway 102 may be configured to generate and send a test message including a source and destination IP address based on routing information located in the routing table. Upon receiving a test message response, media gateway may generate a packet log indicating the measured delay between the transmission of the test message and the reception of the test message response. Media gateway 102 may then be configured to automatically adjust the user-configurable value associated with the two or more entries based on the packet log and the delay.

For example, media gateway 102 may generate a test message including source address IPh1 and send it to media gateway 104. Returning to Table 1, the test message above is routed via outgoing interface 110 to nexthop 114. Consequently, media gateway 102 receives a test message response from MG 104 and a packet log is generated. In this example, the packet log indicates that a significant time delay occurred between the transmission of the test message on outgoing port 110 and the reception of the test message response. Therefore, media gateway 102 may automatically raise the route cost value associated with the congested route corresponding to interface 110, and automatically lower the route cost value associated with the alternative route corresponding to interface 112. Thus, when a second test message is generated including an identical source and destination address, it will be routed via router 120. In this way, network traffic flow management may be achieved between media gateways connected by multiple routes.

In another embodiment, the routing table located at MG 104 to be a mirror image of the routing table located at MG 102. The result is that packets transmitted from MG 102 to MG 104 traverse a network path designated in the routing table located on MG 102, and moreover, that packets belonging to the same VoIP session will traverse the same network path from MG 104 to MG 102, as designated by the routing table located at MG 104. Therefore, any transmission delay associated with a route is equally shared by packets in both directions.

It is appreciated that the structure of the source-aware routing table 113 illustrated in Table 1 is merely an example. Fields may be added, deleted, or replaced without departing from the scope of the subject matter described herein. In addition, fields in Table 1 may be distributed across multiple tables without departing from the scope of the subject matter described herein.

Figure 3:
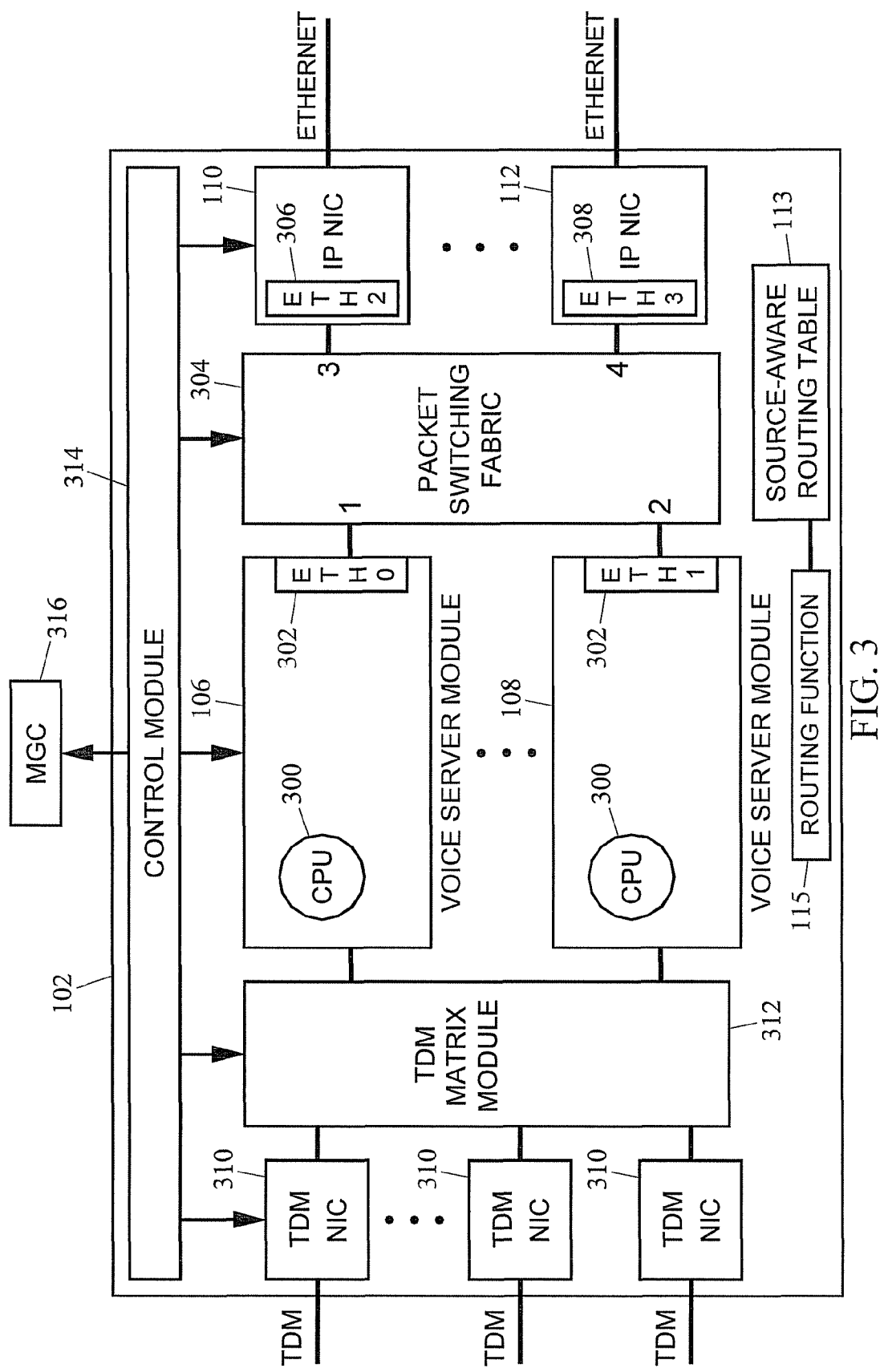
FIG. 3 is a block diagram illustrating an exemplary internal architecture of a media gateway including a source-aware routing table according to an embodiment of the subject matter described herein.

FIG. 3 is a block diagram illustrating an exemplary internal architecture of a media gateway including a source-aware routing table according to an embodiment of the subject matter described herein. Referring to FIG. 3, media gateway 102 includes a plurality of voice server modules 106 and 108 for performing voice processing functions. In the illustrated example, each voice server module 106 and 108 includes a CPU 300 and may implement real time transmission protocol (RTP), ATM adaptation layer 1, and ATM adaptation layer 2 for sending and receiving voice packets over IP or ATM networks. Voice server modules 106 and 108 may also include circuitry for implementing one or more voice over packet protocols, such as RTP, AAL1, AAL2, or any other suitable voice over packet protocol. Further, each VSM may perform transcoding, echo cancellation, and other payload translation functions and include Ethernet interfaces 302 for communicating with other modules. CPU 300 controls the overall operation of each voice server module 106 and 108. In order to switch packets from network interface cards 110-112 to the appropriate voice server module 106 or 108, media gateway 102 includes a packet switching fabric 304. Ethernet interfaces 306-308 connect each voice server module 106 and 108 to a packet switching fabric 304. Packet switching fabric 304 may be any suitable type of switching fabric for switching packets between voice server modules 106 and 108 and Ethernet interfaces 306-308. Examples of switching fabrics suitable for use with embodiments with the subject matter described herein include ATM switching fabrics and Ethernet switching fabrics. In the examples described below, it will be assumed that packet switching fabric 304 comprises an Ethernet switching fabric.

Packet switching fabric 304 interconnects voice servers 106 and 108 and broadband network interfaces 110-112. Each network interface card 110-112 may implement network layer functions and packet forwarding functions, including Internet protocol (IP) forwarding functions. In the illustrated example, different packet network interface cards are provided to connect to external Ethernet, Packet Over SONET (POS), and asynchronous transfer mode (ATM) networks, multi-protocol label switching (MPLS), frame relay, or any other suitable packet interface. In the illustrated example, packet switching fabric 304 includes a plurality of ports, numbered 1-4. Four ports are shown for illustrative purposes only. It is understood that packet switching fabric 304 may include fewer or more than four ports, depending on the number of devices connected to packet switching fabric 304.

Media gateway 102 may also include interfaces for sending and receiving media streams to and from a plurality of different types of networks. For example, the media gateway 102 may include time division multiplexed (TDM) network interface cards (NIC) 310. TDM network interface cards 310 send and receive media streams to and from external TDM networks. TDM network interface cards 310 may implement any suitable physical layer protocol for sending and receiving messages over TDM links. For example, each TDM NIC 310 may terminate one or more TDM voice trunks.

Media gateway 102 also includes a time division multiplexing (TDM) matrix module 312 for switching TDM timeslots between TDM network interface cards 310 and VSMs 106 and 108. TDM network interface cards 310 connect media gateway 102 to external TDM devices, such as TDM-enabled switching offices.

Control module 314 controls the overall operation of media gateway 102, including communication between VSMs 106-108 and IP NICs 110-112 via packet switching fabric 304. In the illustrated example, control module 314 may use information received from each voice server module 106-108 to perform a lookup for a matching entry in source-aware routing table 113.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for source-aware IP routing between media gateways connected by multiple routes, the method comprising:
   receiving a packet at a media gateway having a source-aware routing table, wherein the packet includes a source IP address and a destination IP address and wherein the source-aware routing table includes source IP address information, destination IP address information, and routing information;
   locating at least one entry, in the source-aware routing table, corresponding to at least a portion of the destination IP address and at least a portion of the source IP address;
   determining whether the at least one entry corresponding to the portion of the destination IP address and to the portion of the source IP address includes two or more entries;
   in response to determining that the at least one entry includes two or more entries, selecting one of the two or more entries based on a user-configurable value associated with the each of the two or more entries; and
   routing the packet based on the routing information included in the selected entry.

2. The method of claim 1 wherein locating at least one entry corresponding to the portion of the destination IP address information in the source-aware routing table includes locating at least one entry based on a longest matching prefix.

3. The method of claim 1 wherein locating at least one entry corresponding to the portion of the source IP address includes locating an entry based on a longest matching prefix.

4. The method of claim 1 comprising:
   monitoring IP traffic for network conditions; and
   automatically adjusting the user-configurable value associated with each of the two or more entries based on the monitored network conditions.

5. The method of claim 1 wherein automatically adjusting the user-configurable value includes adjusting the values for load-balancing IP packets transmitted to a destination.

6. The method of claim 1 wherein monitoring IP traffic for network conditions includes:
   generating a test message including a source and destination IP address;
   sending the test message using the routing table;
   receiving a test message response;
   generating a packet log; and
   measuring the delay between sending the test message and receiving the test message response.

7. The method of claim 1 wherein locating an entry in the source-aware routing table corresponding to at least a portion of the destination IP address and at least a portion of the source IP address includes:
   locating at least one entry corresponding to the destination IP address in the source-aware routing table; and
   locating, from among the at least one entry corresponding to the destination IP address, at least one entry corresponding to the source IP address and including routing information.

8. A media gateway for source-aware routing of IP packets that is connected to at least one other media gateway by multiple routes, the media gateway comprising:
   a source aware routing table including a plurality of entries each containing at least a portion of source IP address, at least a portion of a destination IP address and routing information including, an interface identifier and a next hop identifier, wherein the routing table includes at least one user-configurable value associated with at least one entry; and
   a routing function for:
      receiving an IP packet including a source IP address and a destination IP address;
      locating at least one entry in the routing table based on the source IP address in the packet and the destination IP address in the packet, where the entry includes at least a portion of a source IP address and at least a portion of a destination IP address and routing information including an interface identifier and a next hop identifier;

determining whether the at least one entry corresponding to the portion of the destination IP address and to the portion of the source IP address includes two or more entries;

in response to determining that the at least one entry includes two or more entries, selecting one of the two or more entries based on a user-configurable value associated with the each of the two or more entries; and routing the packet based on the routing information included in the selected entry.

9. The media gateway of claim 8 wherein the routing function is further configured to generate a test message, transmit the test message, and receive a test message response.

10. The media gateway of claim 9 wherein the routing function is configured to automatically adjust the at least one user-configurable value based on the test message and the test message response.

11. The media gateway of claim 8 wherein the source aware routing table includes route cost information associated with at least some of the entries.

12. The media gateway of claim 8 wherein the source aware routing table and the routing function are located in the media gateway and wherein the routing function selects an interface in the media gateway and routes the packet based on the routing information included in the at least one matching entry.

13. A non-transitory computer readable medium having stored thereon computer executable instructions that when executed by the processor of a computer perform steps comprising:

receiving a packet at a media gateway having a source-aware routing table, wherein the packet includes an source IP address and an destination IP address and wherein the source-aware routing table includes source IP address information, destination IP address information, and routing information;

locating at least one entry, in the source-aware routing table, corresponding to at least a portion of the destination IP address and at least a portion of the source IP address;

determining whether the at least one entry corresponding to the portion of the destination IP address and to the portion of the source IP address includes two or more entries;

in response to determining that the at least one entry includes two or more entries, selecting one of the two or more entries based on a user-configurable value associated with the each of the two or more entries; and routing the packet based on the routing information included in the selected entry.

14. The non-transitory computer readable medium of claim 13 wherein locating at least one entry corresponding to the portion of the destination IP address information in the source-aware routing table includes locating at least one entry based on a longest matching prefix.

15. The non-transitory computer readable medium of claim 13 wherein locating at least one entry corresponding to the portion of the source IP address includes locating an entry based on a longest matching prefix.

16. The non-transitory computer readable medium of claim 13 comprising:

monitoring IP traffic for network conditions; and automatically adjusting the user-configurable value associated with each of the two or more entries based on the monitored network conditions.

17. The non-transitory computer readable medium of claim 13 wherein automatically adjusting the user-configurable value includes adjusting the values for load-balancing IP packets transmitted to a destination.

18. The non-transitory computer readable medium of claim 13 wherein monitoring IP traffic for network conditions includes:

generating a test message including a source and destination IP address;

sending the test message using the routing table;

receiving a test message response;

generating a packet log; and measuring the delay between sending the test message and receiving the test message response.

* * * * *